United States Patent
Mikan et al.

(10) Patent No.: US 8,488,749 B2
(45) Date of Patent: *Jul. 16, 2013

(54) SYSTEMS AND METHODS FOR CALL REPLAY

(71) Applicant: AT&T Mobility II, LLC, Atlanta, GA (US)

(72) Inventors: Jeffrey Mikan, Atlanta, GA (US); Justin McNamara, Atlanta, GA (US); John Lewis, Lawrenceville, GA (US); Fulvio Cenciarelli, Suwanee, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/632,394

(22) Filed: Oct. 1, 2012

(65) Prior Publication Data

US 2013/0028398 A1   Jan. 31, 2013

Related U.S. Application Data

(63) Continuation of application No. 12/340,261, filed on Dec. 19, 2008, now Pat. No. 8,290,124.

(51) Int. Cl.
*H04M 1/64* (2006.01)

(52) U.S. Cl.
USPC ....... 379/68; 379/88.23; 379/93.21; 379/158; 379/202.01

(58) Field of Classification Search
USPC .................. 379/93.21, 158, 202.01, 205.01, 379/68, 88.16, 88.22, 88.23; 455/412.1
See application file for complete search history.

(56) References Cited

U.S. PATENT DOCUMENTS

| | | | |
|---|---|---|---|
| 5,903,868 A | 5/1999 | Yuen et al. | |
| 6,038,199 A | 3/2000 | Pawlowski et al. | |
| 6,049,765 A | 4/2000 | Iyengar et al. | |
| 6,222,909 B1 | 4/2001 | Qua et al. | |
| 6,226,533 B1 | 5/2001 | Akahane | |
| 6,526,128 B1 | 2/2003 | Kermani | |
| 6,944,440 B1 | 9/2005 | Kim | |
| 6,959,075 B2 * | 10/2005 | Cutaia et al. | 379/202.01 |
| 7,502,448 B1 | 3/2009 | Elman et al. | |
| 7,809,388 B1 * | 10/2010 | Othmer | 455/518 |
| 8,290,124 B2 | 10/2012 | Mikan et al. | |
| 2004/0190700 A1 * | 9/2004 | Cutaia et al. | 379/202.01 |
| 2005/0053214 A1 * | 3/2005 | Reding et al. | 379/202.01 |
| 2008/0267363 A1 | 10/2008 | Pickett | |
| 2010/0042647 A1 | 2/2010 | Schultz et al. | |

FOREIGN PATENT DOCUMENTS

WO   WO 2004/077381   9/2004

* cited by examiner

*Primary Examiner* — Olisa Anwah

(74) *Attorney, Agent, or Firm* — Woodcock Washburn LLP (57) ABSTRACT

Call replay systems and methods are disclosed. A call replay system can record a telephonic communication and replay the recorded communication upon request. The entire communication may be recorded, or only a portion, such as the most recent few minutes. The entire recording can be transmitted to a requestor, or only a portion. The recording may be altered before it is transmitted to a requestor. Alterations may include actions taken to reduce playback time, such as removing spaces in the recording where no conversation is taking place, or speeding up the recording. Other alterations may include adjusting the sonic characteristics of the recording, translating the recording, or transcribing the recording to create a text version.

20 Claims, 8 Drawing Sheets

SYSTEMS AND METHODS FOR CALL REPLAY

CROSS REFERENCE TO RELATED APPLICATION

This application is a continuation of, and claims priority to, U.S. patent application Ser. No. 12/340,261, now U.S. Pat. No. 8,290,124, filed Dec. 19, 2008, entitled "Conference Call Replay," the entire contents of which are hereby incorporated herein by reference.

BACKGROUND

With the increasing availability and use of technology in the workplace and at home, people are more likely to be working on two or more tasks at the same time, often referred to as "multitasking". Because communications technology has become more advanced and less expensive, and because traveling to meetings has become more expensive and, at times, more risky, meetings are often held over the telephone in the form of conference calls. Meeting attendees often multitask while participating in a conference call. This may result in an attendee missing parts of the conference call due to distractions from other tasks the attendee may be performing. This may also be a problem with simple two party telephone calls. Other situations may occur while using a telephone where the user did not hear or did not understand some part of the conversation. In these and other situations there exists a need to improve to ability of a telephone user to understand and participate in a telephonic communication.

SUMMARY

Systems and methods are provided herein for recording a telephonic communication and transmitting the recorded telephonic communication to a requesting user. Recording of the telephonic communication may commence at the initiation of the telephonic communication, automatically or as configured by a user, or it may commence upon instruction from a participant in the communication or another user or device. The entire communication may be recorded, or only a portion. The portion recorded may be specified by a user or set to a particular portion. For example, the most recent few minutes of a telephonic communication may be recorded, and the portions of the recorded telephonic communication that are older than the most recent few minutes may be deleted.

Upon request for the recorded telephonic communication, the system may transmit the recorded telephonic communication to only the requesting party using a separate channel, or may transmit the recorded telephonic communication to all participants in the telephonic communication.

Before transmission of the recorded telephonic communication, the recorded telephonic communication may be altered. Several ways of altering the recorded telephonic communication are disclosed, including cutting out space in the recording where no conversation is taking place, speeding up the playback of the recording, and altering the sonic characteristics of the recording. The recorded telephonic communication may also be transcribed and provided in text form to a requesting user, or translated and provided to a requesting user (in a text or audio version) in a different language.

These and other features and advantages of various exemplary embodiments of systems and methods according to this disclosure are described in, or are apparent from, the following detailed description of various exemplary embodiments of the systems and methods of this subject matter.

BRIEF DESCRIPTION OF THE DRAWINGS

Various exemplary embodiments of this invention will be described in detail, with reference to the following figures, wherein like numerals represent like elements, and wherein.

DETAILED DESCRIPTION OF ILLUSTRATIVE EMBODIMENTS

The subject matter of the disclosed embodiments is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

In the discussion that follows, details relating to telephony devices and networks are assumed to be known to those skilled in the art. Accordingly, such details are largely omitted herein for the sake of clarity and explanation. In addition, any references herein to an example embodiment involving a cellular, wireless, or mobile telephone are used solely for purposes of explanation, and are not intended to limit the invention to any such embodiment. For example, a wireless device as contemplated by various embodiments of the invention may include, but is not limited to: cellular telephones, personal digital assistants (PDAs), email devices, portable and non-portable computers, and the like. The wireless device may operate in a cellular, SMR, PCS, cordless, unlicensed AWS, 700 MHz, or other spectrums. Furthermore, embodiments are not limited by the network servicing the device. Accordingly, embodiments may be applicable to any network type including, for example, TDMA, CDMA, WCDMA, GSM, WiFi, WiMAX, OFDM, UMTS, EV-DO, HSDPA/HSUPA, and other standards now known or to be developed in the future.

Modern communications devices allow people to communicate with one another through many different channels. Standard telephones, work telephones, mobile telephones and other mobile devices, and the various types of computers and computing devices provide a plethora of communications options to the average person. These devices also provide ample opportunity for working several tasks at once, often called "multitasking" With the cost of obtaining and using such devices continuing to decrease, the communications options available will expand even further, as will the opportunities for multitasking. However, a problem often occurs when a user is unable to understand or did not hear a portion of a telephonic communication. This may be due to multitasking, or it may be due to other causes, such as background noise, inattention, or any of the myriad of interferences that have affected telephonic communications since the inception of the telephone.

Figure 1:
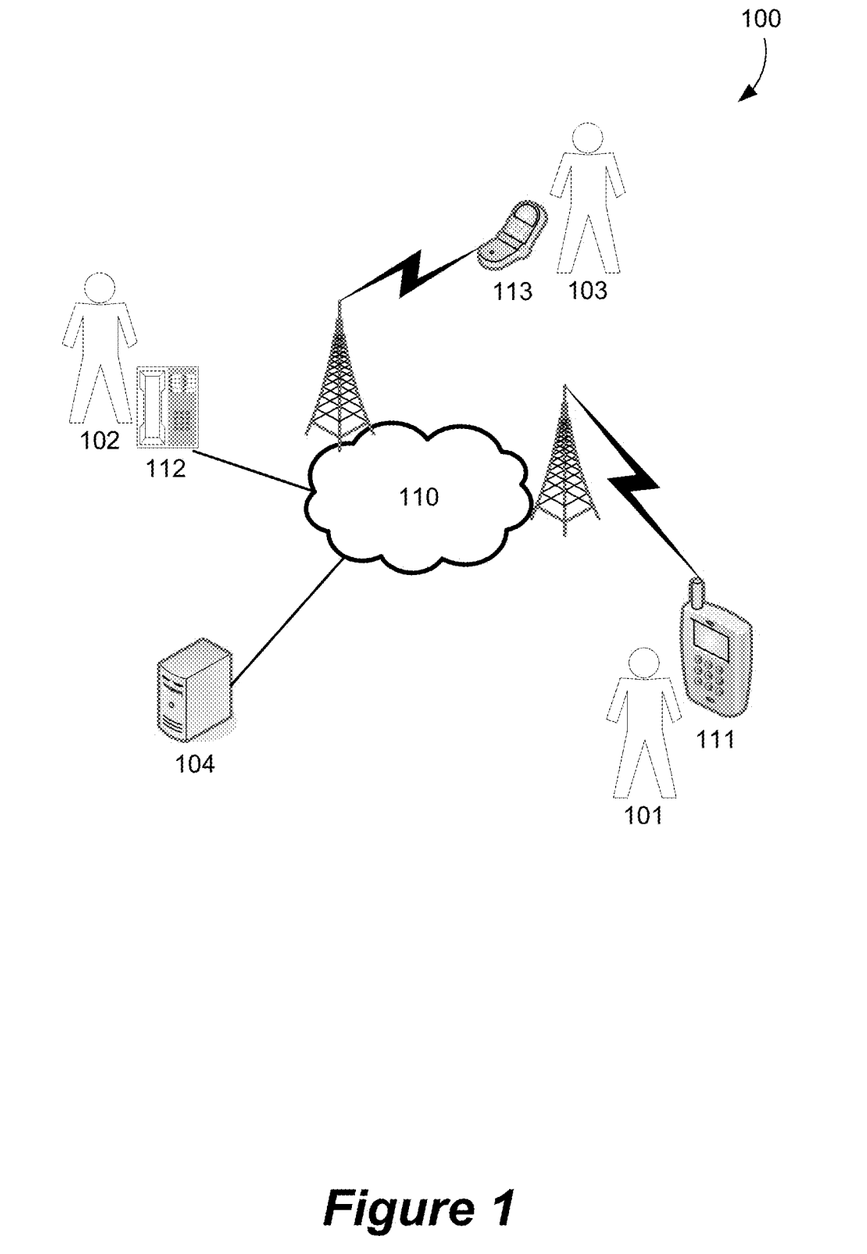
FIG. 1 is a block diagram of a non-limiting, exemplary call replay system including communications devices, a network, and users.

FIG. 1 illustrates a system 100 including communications devices, a network, and a network device that may be in use during a telephonic communication. User 101 may be participating in a telephonic communication with users 102 and 103. This may be a three-way call, a conference call, or any other form of voice communications. It is contemplated that any other number of users, including one user maybe participating in a telephonic communication with any other users and/or devices. For example, a user may be communicating with an automated system rather than one or more other users.

User 101 may be operating mobile communications device 111 as a means to participate in the telephonic communication. Mobile communications device 111 may be any type of mobile communications device as described herein, or any device capable of wirelessly facilitating telephonic communications. For example, mobile communications device 111 may be a mobile, wireless, and/or cellular telephone of any type, a personal data assistant (PDA), a laptop or other mobile computer, or any other mobile telephony-capable device.

Similarly, user 103 may be using mobile communications device 113 to participate in the telephonic communication. Mobile communications device 113 may also be any type of mobile communications device as described herein, or any device capable of wirelessly facilitating telephonic communications. For example, mobile communications device 113 may be a cellular telephone, a mobile telephone of any type, a personal data assistant (PDA), a laptop or other mobile computer, or any other mobile telephony-capable device.

User 102 maybe using wired communications device 112 to participate in the telephonic communication. Wired communications device 112 may be any type of wired communications device capable of facilitating telephonic communications, including a traditional telephone, an internet protocol (IP) telephone, a digital telephone, a computer of any type configured to facilitate telephonic communications, or any other wired telephony-capable device.

Users 101, 102, and 103, through the operation of devices 111, 112, and 113, may be communicating through network 110. Network 110 may be one or more wired and/or wireless network of any type, non-limiting examples of which are described herein, or any combinations thereof. Any form of telecommunications, voice, or data network, or any combination of such networks, may be present in network 110.

Network device 104 may be communicatively connected to network 110, may be a subsystem of network 110, and may be operated, owned, and/or maintained by the operator of network 110 or by a third party. Network device 104 may or may not be geographically located in the same room, building, region, or area as other devices that make up network 110. Network device 104 may facilitate the telephonic communication between user 101, 102, and 103. Network device 104 may provide telephony services as known to those skilled in the art. For example, network device 104 may function as a private branch exchange (PBX). In one embodiment, network device 104 provides call replay services as described herein.

Network device 104 may be configured to record the telephonic communication between users 101, 102, and 103. Network device 104 may also be configured to perform other network tasks, or may be configured only for recording telephonic communications. The recording may be performed using any means known to those skilled in the art, including storing the communication on one or more computer storage devices, such as a hard disk drive or random access memory, recording the communication on magnetic or digital tape, disks, or other media, or any other effective recording means. Network device 104 may also be configured to accept instructions and/or commands from users and/or other network devices directly and/or through network 110.

In one embodiment, network device 104 is configured to record only a portion of the telephonic communication. For example, network device 104 may be configured to record only the most recent portion of the communication, such as the most recent two minutes. Alternatively, network device 104 may be configured to accept commands from one of users 101, 102, and/or 103, or another user or device, that instruct network device 104 to record a specified portion of the telephonic communication. Such commands may be transmitted to network device 104 through network 110. Such commands may be issued using a device, such as mobile communications device 111. For example, user 101 may press one or more keys on the keypad of mobile communications device 111 during the telephonic communication. The activation of the one or more keys may cause a signal to be transmitted to network device 104 that instructs network device 104 to perform a task or alter a configuration parameter. The signal may be the form of traditional telephony tones, or any other form of communication, such as a data command, packet or frame containing the instructions, etc.

Alternatively, network device 104 may detect voice commands, or another device communicatively connected to network device 104 may detect voice commands and transmit such commands to network device 104. In yet another alternative, network device 104 may receive instructions from one or more users or devices through a data interface. For example, user 101 may interface with network device 104 using a web page displayed on mobile communications device 111 or on another device. Commands and instructions may be provided by any user, or by a subset of users, such as a designated chairman in a conference call system. Any means or method may be used to transmit instructions to network device 104 and/or limit the users permitted to transmit such instructions, and all such means and methods are contemplated as within the scope of the present disclosure.

Network device 104 may be configured, or instructed, to begin recording the telephonic communication as soon as it begins, or at a specific time. For example, as a subsystem of a conference calling system, network device 104 may be connected to the conference call and begin recording the telephonic communication on the call at the call's inception. Alternatively, each user of the conference call system may have the ability to send an instruction to network device 104 that instructs network device 104 to begin recording the telephonic communication. Such recorded telephonic communication may then be accessible by the user who sent the instruction and/or by other users. In another alternative, in a conference call system, a chairman or other user in control of the conference call may be the only user that is permitted to instruct device 104 to begin recording the telephonic communication. Any other permutation of users and/or devices that are permitted or configured to instruct network device 104 to record a telephonic communication are contemplated as within the scope of the present disclosure.

Once recording of the telephonic communication has begun, playback of the recorded telephonic communication may be available. For example, user 101 may be participating in a conference call with users 102 and 103. User 101 may have been unable to hear the last comment made during the conference call. User 101 may transmit an instruction using mobile communications device 111 to network device 104 requesting that the recorded telephonic communication be played back. Such an instruction may be transmitted through the activation of one or more keys on mobile communications device 111. For example, the activation of the '*' key may instruct network device 104 to transmit the recorded telephonic communication. Alternatively, user 101 may operate an interface to network device 104 using other means, such as a web page, text messaging, email, or any other means of communication. The means of communicating with network device 104 may be operated through mobile communications device 111, or through an alternative device separate from mobile communications device 111, such as a computer with a web browser configured to connect to network device 104. Any means or method of communicating and/or transmitting instructions to network device 104 is contemplated as within the scope of the present disclosure.

Upon receiving the instruction or command to play back the recorded telephonic communication, network device 104 may transmit the recorded telephonic communication. In one embodiment, only the requesting user may receive the transmission of the recorded telephonic communication. For example, user 101 may receive the recorded telephonic communication on mobile communications device 111 via a separate channel, so that user 101 can hear the recorded telephonic communication, but the other participants on the conference call or telephonic communication cannot. Alternatively, the recorded telephonic communication may be transmitted such that all participants on the conference call or telephonic communication can hear the transmission. In yet another alternative, a subset of the participants on a conference call or telephonic communication may be able to hear transmissions of the recorded telephonic communication. Such a subset may be configured by one or more of the participants, or may be determined by other means, such as device capabilities, etc. Any combination or permutation of participants permitted to hear a transmission of a recorded telephonic communication is contemplated as within the scope of the present disclosure.

Network device 104 may transmit the entire recorded telephonic communication upon instruction. For example, if network device 104 has been configured to record or transmit the most recent one minute of a telephonic communication, upon instruction, network device 104 may transmit the recorded telephonic communication starting at one minute prior to receiving the instruction. Alternatively, a user may request a specific portion of the recorded telephonic communication. User 101, in combination with the request to transmit the recorded telephonic communication, may request the portion of the recorded telephonic communication to be transmitted. For example, in one embodiment, where the activation of the '*' key may instruct network device 104 to transmit the recorded telephonic communication, the activation of the '1' key may instruct network device 104 to play the most recent one minute of the recorded telephonic communication. Thus, user 101 may press "*1" on mobile communications device 111 to instruct network device 104 to play back the last one minute of the recorded telephonic communication. Alternatively, user 101 may activate a control on an interface to network device 104, such as a web page, either using mobile communications device 111 or some other device, to instruct network device 104 to transmit the recorded telephonic communication. Other key combinations and other forms of providing instructions to network device 104 are contemplated as within the scope of the present disclosure.

In one embodiment, a user may have the option to instruct network device 104 to transmit the recorded telephonic communication to one or more particular devices. For example, user 101 may interface with network device 104 through a web page that allows user 101 to select mobile communications device 111, mobile communications device 113, wired communications device 112, and/or other devices as the recipient(s) of a transmission of the recorded telephonic communication. Alternatively, only a default device may receive the transmission, such as the requesting device. In another embodiment, one or more select participants on a conference call or telephonic communication, or one or more specific users of network device 104 or a conference call system may have the ability to select recipient devices for transmissions of recorded telephonic communications. All combinations and permutations of recipients of recorded telephonic communications are contemplated.

The transmission of the recorded telephonic communication may be uninterruptable so that, once initiated, the entire recorded telephonic communication, or the selected subset thereof, is transmitted to the requesting device or user, or selected device or users. Alternatively, a command or instruction may be transmitted to network device 104 instructing network device 104 to stop transmitting the recorded telephonic communication. Such a command or instruction may take the form of the activation of a key on a key pad of a device, such as mobile communications device 111, or the activation of a control on an interface to network device 104, such as a web page.

In another embodiment, network device 104 may be configured to automatically stop transmission of the recorded telephonic communication when the requesting user, or another user, begins speaking This may be accomplished by detecting the voice of the speaker in the conference call or telephonic communication. For example, if user 101 did not hear the last comment in a conference call, user 101 may send an instruction to network device 104 to play the recorded telephonic communication. Once user 101 gets the gist of the last comment, user 101 may begin speaking to respond to the last comment. This speech may be detected, by network device 104 or by one or more other devices connected to network 110 that communicate with network device 104, and network device 104 may stop, or be instructed to stop, the transmission of the recorded telephonic communication. Other means and methods are contemplated of stopping and/or instructing network device 104 to stop the transmission of a recorded telephonic communication.

In one embodiment, network device 104 may alter the recorded telephonic communication before or during transmission. In one alternative, network device 104 may speed up the recorded telephonic communication so that the recorded information can be heard in less time. For example, network device 104 may record the most recent two minutes of a conference call or telephonic communication, and then transmit the recorded telephonic communication in one minute. In one embodiment, network device 104 is configured to play back recorded telephonic communications at a higher speed automatically, while in another embodiment, the speed of playback may be provided via an instruction from a requesting user or another, using any of the instruction means described herein or known to those skilled in the art.

Playback at a higher speed may be accompanied by other alteration that make the user experience more enjoyable. For example, the pitch, octave, or other sonic characteristics of the recorded telephonic communication may be altered so that, when played at a higher speed, the voices on the recorded telephonic communication still sound normal rather than high-pitched. Other sonic alterations are contemplated. Such alterations may be performed automatically by network device 104, or may be performed upon instruction by a user, device, or other means, using any of the instruction means described herein or known to those skilled in the art.

In one embodiment, space, blanks, or "dead air" may be removed from the recorded telephonic communication as it is recorded, or before or during transmission. For example, in the interest of reducing the time required to play back a recorded telephonic communication, pauses between conversation may be removed. Network device 104 may be configured to discriminate between pauses and spaces between words, in one embodiment, using a predetermined amount of time of dead air as an indicator that a pause is to be removed. Means and methods of determining pauses in a recorded conversation are known to those skilled in the art, and all such means and methods are contemplated as within the scope of the present disclosure.

In another embodiment, the recorded telephonic communication may be transcribed into text by network device 104, or sent to another device for transcription, instead of, or in addition to, transmitting an audible version of the recorded telephonic communication. This may be done automatically, or on request or instruction of a user using any of the instructing methods and means described herein. Such a transcription may be provided to a user via email, text message, web page interface, or any other method or means capable of providing text to a user. The amount and portion of the recorded telephonic communication that is transcribed and provided to a user may be specified using any of the means and methods described herein to specify a portion of the recorded telephonic communication to be transmitted. Means and methods of transcribing voice data into text are known to those skilled in the art, and all such means and methods are contemplated as within the scope of the present disclosure.

In yet another embodiment, the recorded telephonic communication may be translated into another language by network device 104, or sent to another device for translation, instead of, or in addition to, transmitting the recorded telephonic communication as recorded in the original language. This may be done automatically, or on request or instruction of a user using any of the instructing methods and means described herein. Alternatively, translated versions of the recorded telephonic communication may be provided in a transcribed form via email, text message, web page interface, or any other method or means capable of providing text to a user. The amount and portion of the recorded telephonic communication that is translated and provided to a user may be specified using any of the means and methods described herein to specify a portion of the recorded telephonic communication to be transmitted. Means and methods of translating recordings into another language are known to those skilled in the art, and all such means and methods are contemplated as within the scope of the present disclosure.

In one embodiment, the call replay system and features described above may be implemented on a user device, such as mobile communications device 111, rather than, or in addition to, a network device such as network device 104. Alternatively, network device 104 may be a component or subsystem of a communications device, such as mobile communications devices 111 or 113, or wired communications device 112. Thus, the functions and features described herein may be performed on a communications device, such as recording telephonic communications, receiving commands and/or instructions affecting the configuration and control of a call replay system, and transmitting and/or transcribing recorded telephonic communication data. All such embodiments, and any embodiments combining wired and/or mobile communications devices and network devices, are contemplated as within the scope of the present disclosure.

Figure 2:
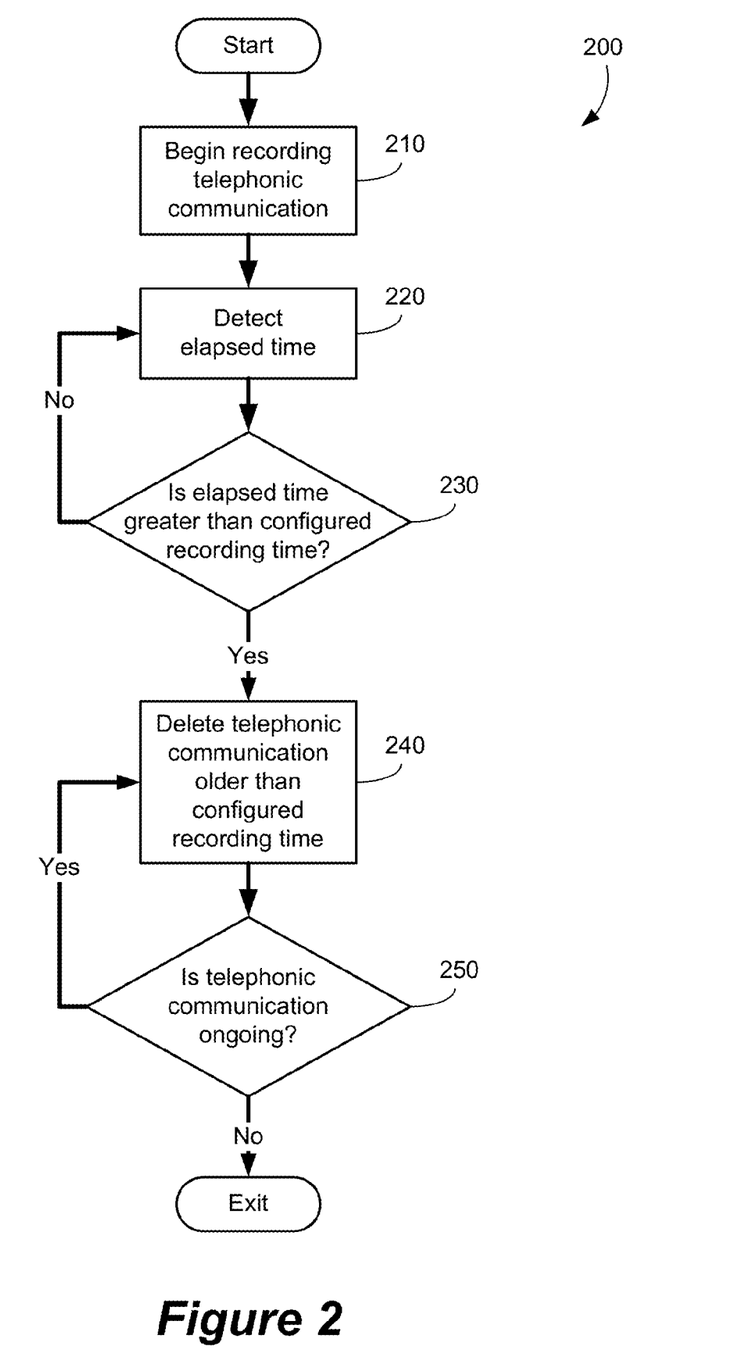
FIG. 2 is a flow chart of a non-limiting, exemplary method of implementing a call replay system.

FIG. 2 illustrates a non-limiting, exemplary method 200 of implementing a call replay system. Once a telephonic communication has begun, or a telephonic communication recording system has been instructed to begin recording, the telephonic communication recording begins at block 210. At block 220, the elapsed time since the recording started is detected. At block 220, it is determined whether the elapsed time is greater than a configured recording time. The configured recording time may be configured by a user, administrator, or another device through an interface to a call replay system as described above in regard to FIG. 1. Alternatively, the configured recording time may be hard-coded to a set amount of time.

If the elapsed time is not greater than the configured recording time, the method returns to block 220. If the elapsed time is greater than the configured recording time, at block 240 the portion of the recorded telephonic communication that is older than the configured recording time may be deleted. For example, if the call replay system is configured to store two minutes of recorded telephonic communication, those portions of the recorded telephonic communication that were recorded longer than two minutes ago may be deleted. In another alternative, those portions of the recorded telephonic communication older than the configured recording time may be retained permanently, and may be accessible to users or select users or administrators of the call replay system. In another alternative, those portions of the recorded telephonic communication older than the configured recording time may be retained as long as memory or storage space is available, or until a storage threshold is reached. After such a threshold is reached, or storage space is no longer available, those portions of the recorded telephonic communication older than the configured recording time may then be deleted. Various means and methods of determining when and how to delete portions of a recorded telephonic communication are contemplated as within the scope of the present disclosure.

At block 250, a determination is made as to whether the telephonic communication is ongoing. If so, the method returns to block 240 to delete portions of the recorded telephonic communication older than the configured recording time. If the telephonic communication is not ongoing, the method is exited.

Figure 3:
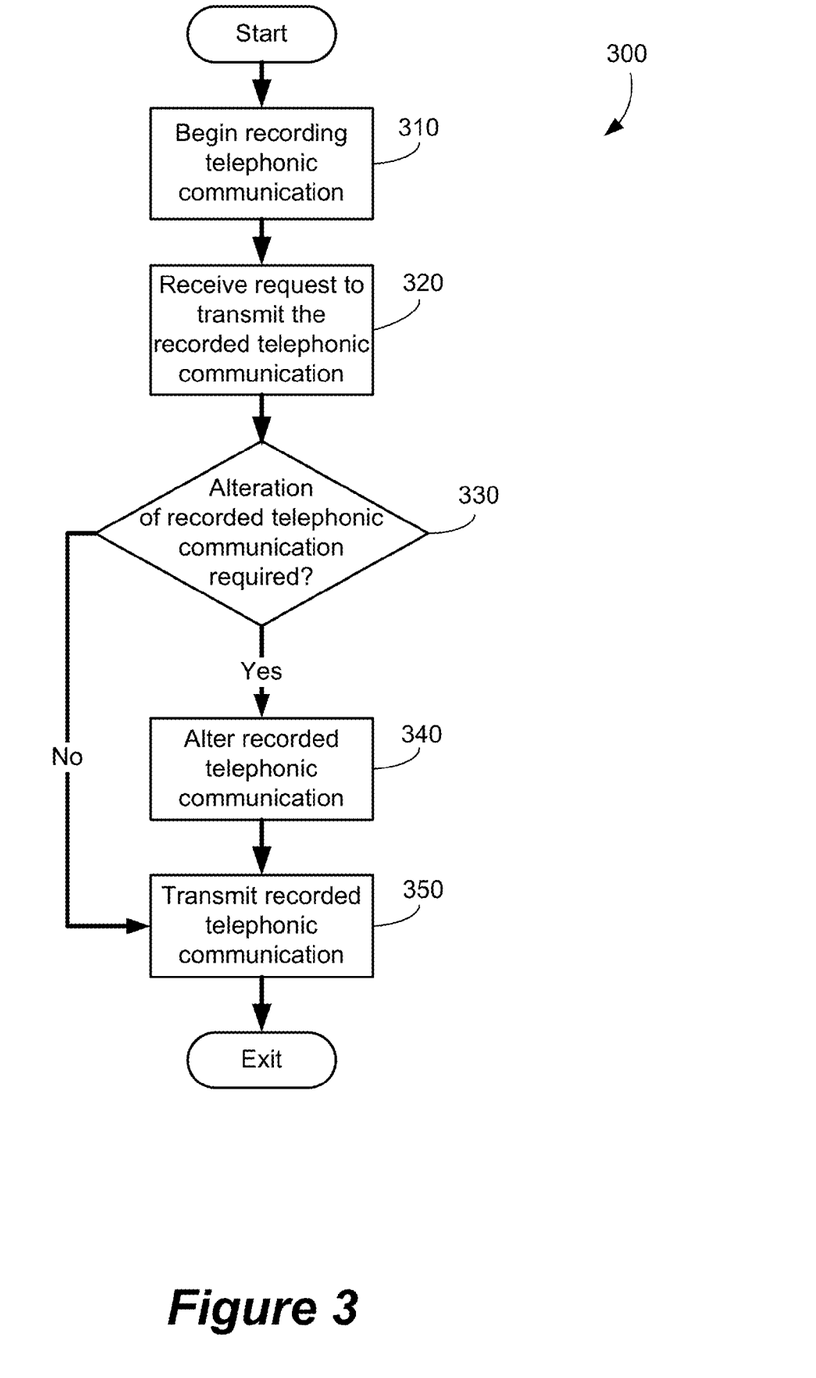
FIG. 3 is a flow chart of another non-limiting, exemplary method of implementing a call replay system.

FIG. 3 illustrates another non-limiting, exemplary method 300 of implementing a call replay system. At block 310, recording of the telephonic communication is started through any means or methods described herein. Once a telephonic communication is in progress, a request for call replay may be received at block 320. As described elsewhere in this disclosure, the request may be received on a device dedicated to call replay functions, a device that provides other network functions as well as call replay, a communications device such as a mobile telephone or computer or a wired telephone or computer, or any combination thereof. The request may take the form of a command or instructions issued from device operated by a user. For example, a user may activate keys on a key pad of a telephone that transmit a tone that may be recognized as a request for call replay. Alternatively, such tones may be intercepted by intermediate network equipment and translated or otherwise used to generate instructions or commands that are transmitted to the call replay system. In yet another alternative, in an embodiment wherein at least a portion of the call replay system is contained on a communications device, the key activation may be detected directly on the device by the call replay system.

In an alternative embodiment, requests are received through an interface to the call replay system. This interface may be a web page, a software application, or other means. For example, a user may operate a mobile communications device with data and telephony capabilities to conduct a telephone call. The user may, while conducting the telephone call, activate a web browser and access a web page that interfaces with the call replay system. Alternatively, the user may activate an application installed on the mobile communications device that is configured to communicate with the call replay system. The user may issue commands and/or instructions to the call replay system through the web page or application interface.

The request received at block 320 may contain parameters, instructions, or other indicators of requestor preferences. For example, the request may include a preference for transmission of the recorded telephonic communication at a speed faster than normal. Alternatively, the request may include a preference for removal of dead air from the recorded telephonic communication. In another alternative, the request may include an instruction to transmit a transcribed version of the recorded telephonic communication to an email address or text message address. Such addresses may also be included in the request. In yet another alternative, the request may include instructions to transmit the recorded telephonic communication to specific devices or users, in addition to or instead of the requesting user. In still another alternative, the request may include instructions to transmit a version of the recorded telephonic communication translated into another language. Any other options or preferences that may be requested are contemplated as within the scope of the present disclosure.

At block 330, a determination is made as to whether the recorded telephonic communication requires alteration. Alteration may be required due to the parameter or instructions supplied with the request as set forth above in regard to block 320. Alternatively, the call replay system maybe configured to alter all requested recorded telephonic communications. For example, the call replay system may be configured to remove all dead air from recorded telephonic communications. Other default, or preconfigured, alteration requirements are contemplated.

In some embodiments, alterations may be performed on the telephonic communication before or during the recording of the recorded telephonic communication. For example, instead of removing dead air from a conversation, the spaces that make up the dead air may not be recorded at all. Alternatively, the recording may be made in a higher speed so that it may be played back at normal speed in a shorter amount of time. In yet another alternative, sonic characteristics of the telephonic communication may be modified before it is recorded. In still another embodiment, a transcription may be made of the telephonic communication, and the transcription may be stored instead of recording the telephonic communication. All other alterations of a telephonic communication that may be performed before, during, or after such a telephonic communication is recorded are contemplated as within the scope of the present disclosure.

If no alterations are required, the recorded telephonic communication is transmitted at block 350. The transmission of the recorded telephonic communication may take the form of any effective means, including transmitting audio over a traditional telephone network, transmitting data packets that are assembled into audio, transmitting audio directly from a communications device, transmitting audio to other recipients other than, or in addition to, the requestor, transmitting an email, text message, or other message containing a transcribed version of the recorded telephonic communication, or any other effective means or method of transmitting the recorded telephonic communication. All such means and methods of transmitting any version, type, format, or equivalent of the recorded telephonic communication are contemplated as within the scope of the present disclosure.

If alterations to the recorded telephonic communication are required, at block 340 the alterations are performed. The alterations may be any of those described in this disclosure, or any other alterations which may be of interest to a user. The altered recorded telephonic communication is transmitted at block 350 using any of the means or methods described herein.

Note that any of the methods, systems, and means described herein may be used for any type of audible data and with any technology. For example, rather than telephone conversations, the methods and means recited herein may be applied to any type of conversation, such as those in a recorded medium or those recorded without the participation of the user requesting the recording. Note also that the call replay system as described herein may be integrated into other telephony or communications related systems and devices, such as a conference call system, a wireless or wireline communications system, or any other type of communications system or device. All such embodiments are contemplated as within the scope of the present disclosure.

Figure 4:
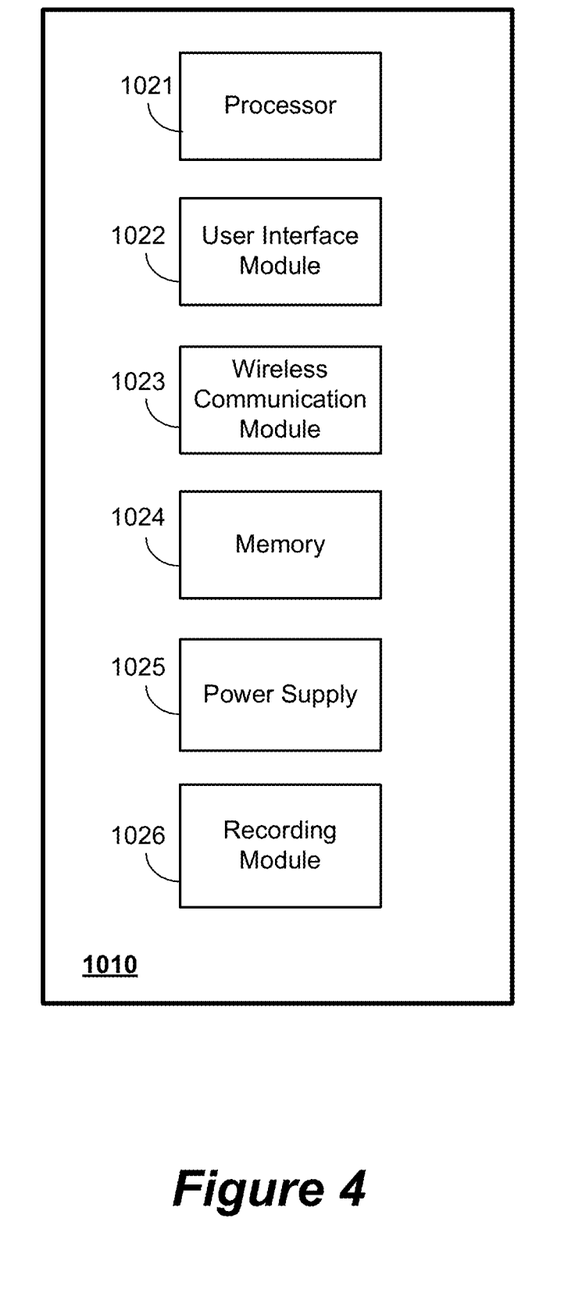
FIG. 4 is a block diagram of a non-limiting, exemplary wireless device that may be used in connection with an embodiment.

FIG. 4 illustrates an example wireless device 1010 that may be used in connection with an embodiment. References will also be made to other figures of the present disclosure as appropriate. For example, mobile communications devices 111 and 113 may each be a wireless device of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware and/or software.

Processor 1021 may be any type of circuitry that performs operations on behalf of wireless device 1010. In one embodiment, processor 1021 executes software (i.e., computer readable instructions stored in a computer readable medium) that may include functionality related to transmitting and receiving telephonic communications, communicating with, operating, or interfacing with a call replay system, and/or running software configured to operate, communicate, or interface with a call replay system, for example. User interface module 1022 may be any type or combination of hardware and/or software that enables a user to operate and interact with wireless device 1010, and, in one embodiment, to interact with a call replay system. For example, user interface module 1022 may include a display, physical and "soft" keys, voice recognition software, microphone, speaker and the like.

Wireless communication module 1023 may be any type or combination of hardware and/or software that enables wireless device 1010 to communicate with, for example, network 110 or any other type of wireless communications network. Memory 1024 enables wireless device 1010 to store information, recorded telephonic communication, call replay software, a web browser, or the like. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010.

Recording module 1026 may be any type or combination of hardware and/or software that enables wireless device 1010 to record telephonic communications. In one embodiment, processor 1021 may perform the functions of recording module 1026. In an alternative embodiment, recording module 1026 may be separate from processor 1023.

Figure 5:
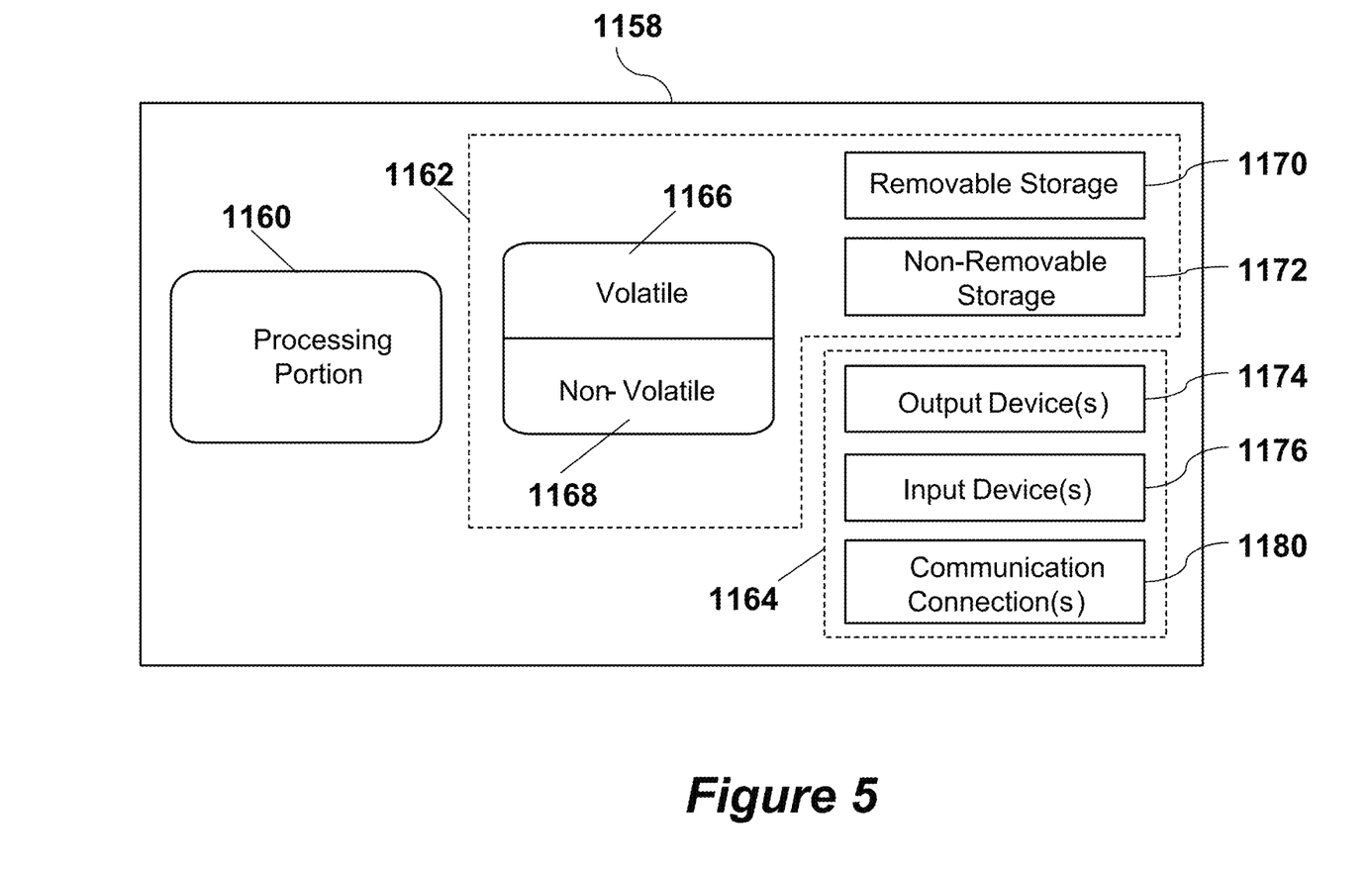
FIG. 5 is a block diagram of a non-limiting, exemplary processor in which the present subject matter may be implemented.

FIG. 5 is a block diagram of an example processor 1158 which may be employed in any of the embodiments described herein, including as one or more components of mobile communications devices 111 or 113, or wired communications device 112, as one or more components of communications network equipment or related equipment, such as any component of network 110, and/or as one or more components of any third party system or subsystem that may implement any portion of the subject matter described herein, such as network device 104. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof.

The processor 1158 comprises a processing portion 1160, a memory portion 1162, and an input/output portion 1164. The processing portion 560, memory portion 562, and input/output portion 1164 are coupled together (coupling not shown in FIG. 5) to allow communications between these portions. The input/output portion 1164 is capable of providing and/or receiving components, commands, and/or instructions, utilized to, for example, operate a call replay system or any subsystem or component thereof.

The processor 1158 can be implemented as a client processor and/or a server processor. In a basic configuration, the processor 1158 may include at least one processing portion 1160 and memory portion 1162. The memory portion 1162 can store any information utilized in conjunction with transmitting, receiving, and/or processing call replay instructions or commands, call replay applications, telephonic communications, recorded telephonic communications, etc. For example, as described above, the memory portion is capable of storing recorded telephonic communications and/or software capable of operating a call replay system. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 can include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium which can be used to store the desired information and which can be accessed by the processor 1158. Any such computer storage media may be part of the processor 1158.

The processor 1158 can also contain the communications connection(s) 1180 that allow the processor 1158 to communicate with other devices, for example through network 110. Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The processor 1158 also can have input device(s) 1176 such as keyboard, keypad, mouse, pen, voice input device, touch input device, etc. Output device(s) 1174 such as a display, speakers, printer, etc. also can be included.

Network 110 may comprise any appropriate telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how IP cellular broadcast may be used with stationary and non-stationary network structures and architectures. It can be appreciated, however, that call replay systems such as those described herein can be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

As one of ordinary skill in the art can appreciate, the exemplary GSM/GPRS environment and services described herein also can be extended to 3G services, such as Universal Mobile Telephone System (UMTS), Frequency Division Duplexing (FDD) and Time Division Duplexing (TDD), High Speed Packet Data Access (HSPDA), cdma2000 1x Evolution Data Optimized (EVDO), Code Division Multiple Access-2000 (cdma2000 3x), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, the systems and methods of a call replay system can be applied independently of the method of data transport, and do not depend on any particular network architecture, or underlying protocols.

Figure 6:
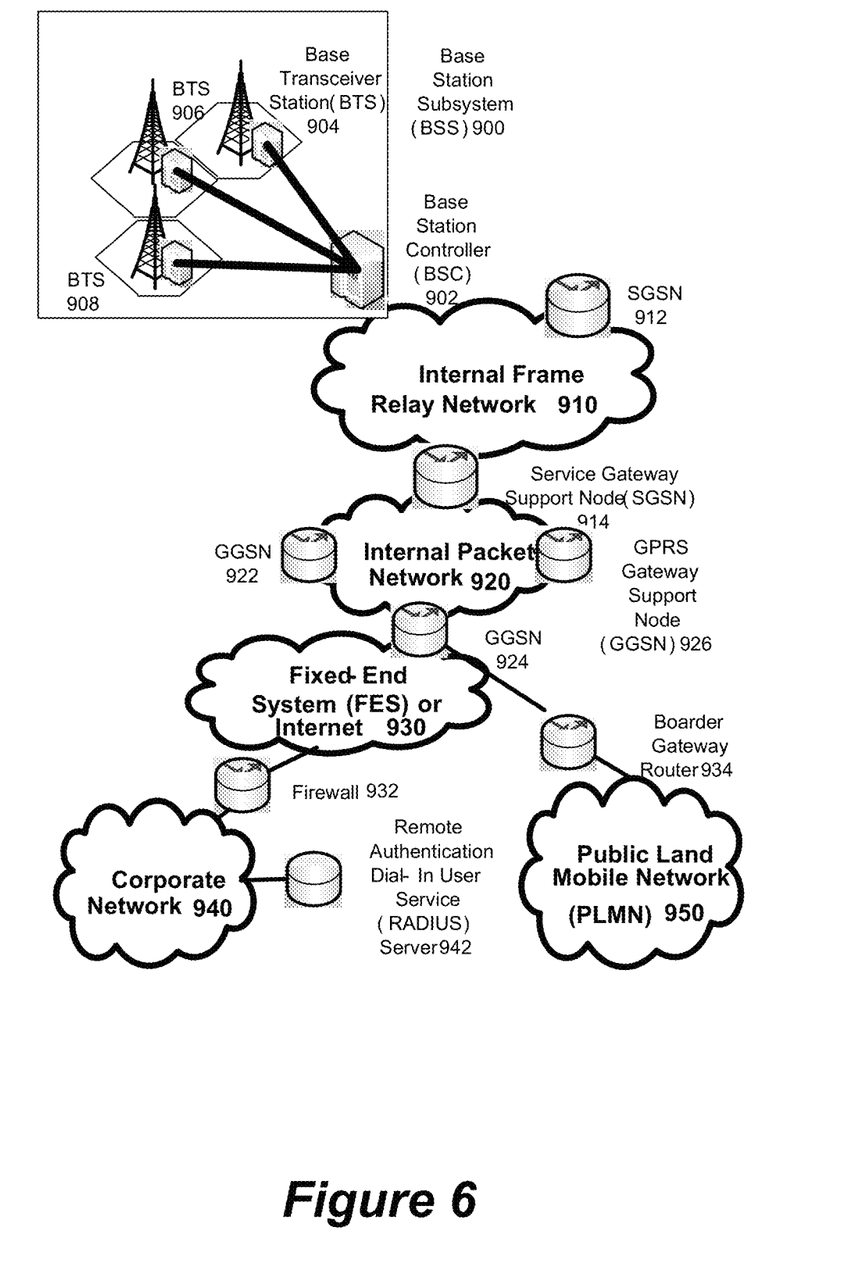
FIG. 6 is an overall block diagram of an exemplary packet-based mobile cellular network environment, such as a GPRS network, in which the present subject matter may be implemented.

FIG. 6 depicts an overall block diagram of an exemplary packet-based mobile cellular network environment, such as a GPRS network, in which call replay systems such as those described herein can be practiced. In an example configuration, network 110 may be encompassed by the network environment depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile communications device 111 or 113) become connected to the wireless network. In exemplary fashion, the packet traffic originating from user devices (e.g., mobile communications devices 111 and 113) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932; and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
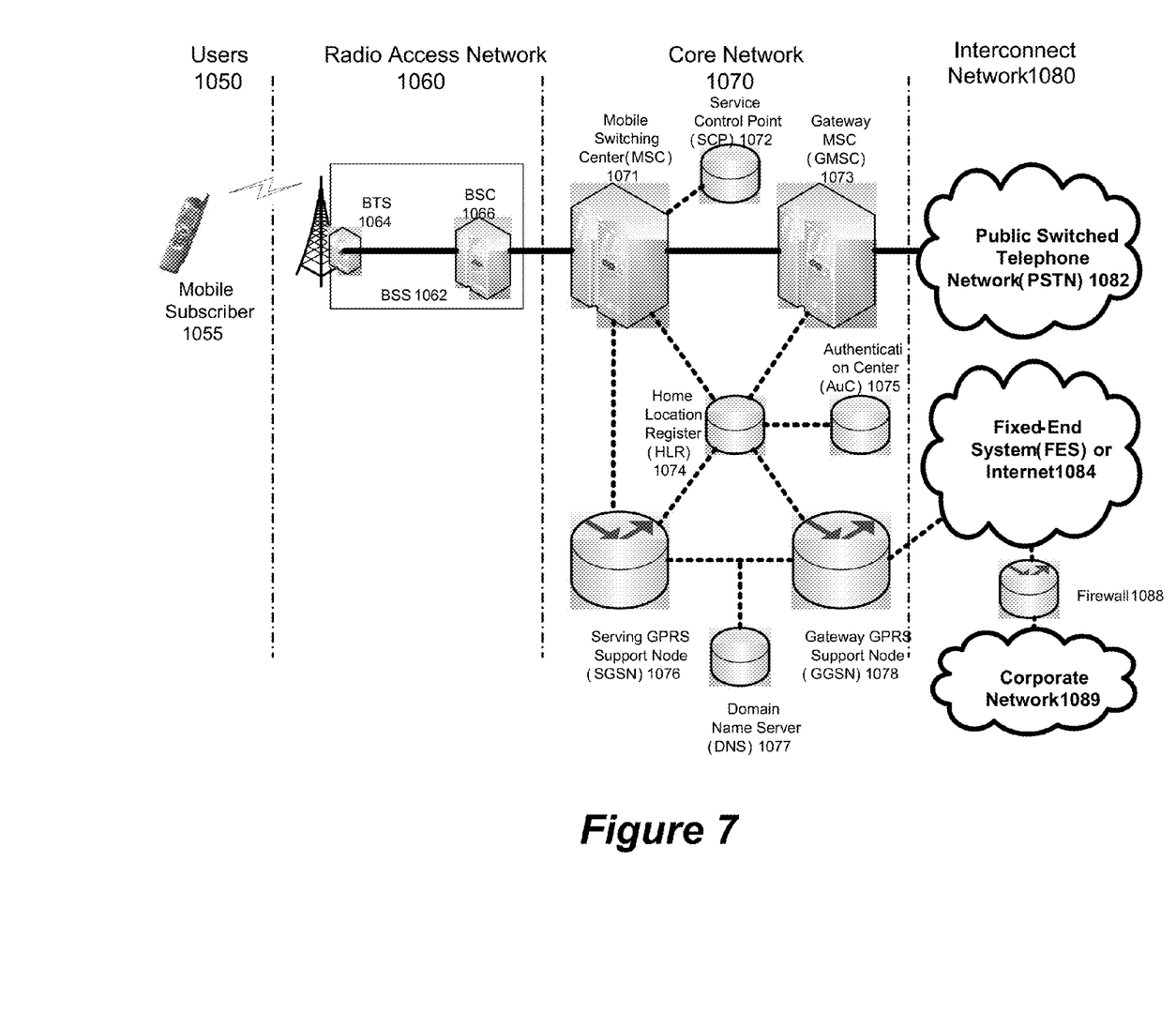
FIG. 7 illustrates a non-limiting, exemplary architecture of a typical GPRS network as segmented into four groups.

FIG. 7 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise mobile communications devices 111 and/or 113. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076, which then sends the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. HLR 1074 may store static information about the subscribers such as the International Mobile Subscriber Identity (IMSI), subscribed services, and a key for authenticating the subscriber. HLR 1074 may also store dynamic subscriber information such as the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile communications device 111 or 113, used by an end user of the mobile cellular service. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself with the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to the Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 can access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of Call replay systems and methods such as those described herein can include but are not limited to Gateway GPRS Support Node tables, Fixed End System router tables, firewall systems, VPN tunnels, and any number of other network elements as required by the particular digital network.

Figure 8:
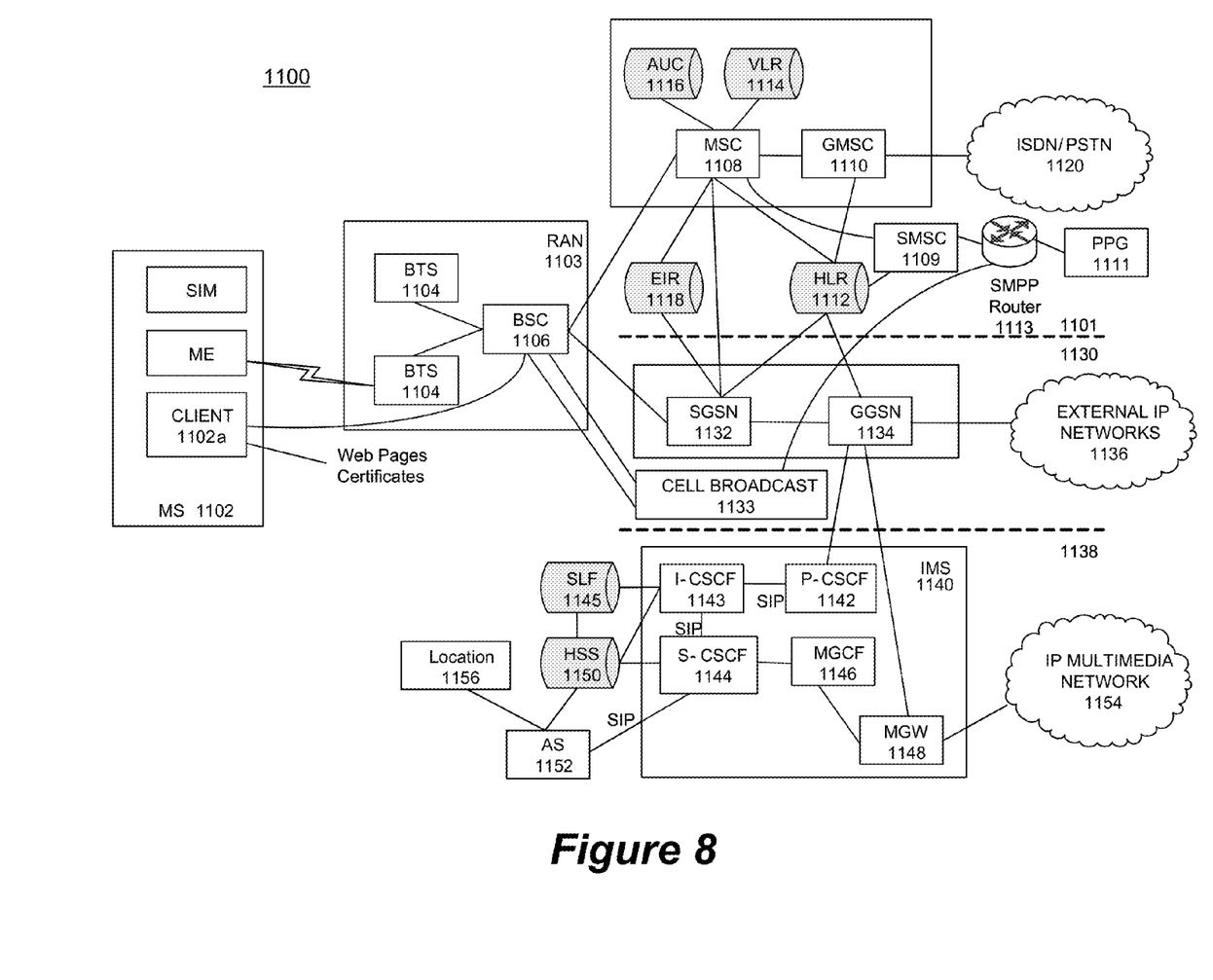
FIG. 8 illustrates a non-limiting alternate block diagram of an exemplary GSM/GPRS/IP multimedia network architecture in which the present subject matter may be implemented.

FIG. 8 illustrates another exemplary block diagram view of a GSM/GPRS/IP multimedia network architecture 1100 in which call replay systems such as those described herein can be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile communications device 111 or 113) that is used by mobile subscribers, with a Subscriber identity Module (SIM). The SIM includes an International Mobile Subscriber Identity (IMSI), which is a unique identifier of a subscriber. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 is a database that may contain administrative information regarding each subscriber registered in a corresponding GSM network. Such information may also include call replay preferences for each subscriber. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The VLR may also contain call replay preferences for each subscriber. The HLR 1112 and the VLR 1114, together with the MSC 1108, may provide the call routing and roaming capabilities of GSM, as well as call replay functionality. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. The MS 1102 may send a location update including its current location information to the MSC/VLR, via the BTS 1104 and the BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

The GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network.

The SGSN may control the connection between the GPRS network and the MS 1102. The SGSN may also keep track of individual MS's locations and security functions and access controls.

A Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

The GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 1130 may be designed to operate in three network operation modes (NOM1, NOM2 and NOM3). A network operation mode of a GPRS network may be indicated by a parameter in system information messages transmitted within a cell. The system information messages may direct a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while receiving data and vice versa.

The IP multimedia network 1138 was introduced with 3GPP Release 5, and may include an IP multimedia subsystem (IMS) 1140 to provide rich multimedia services to end users. A representative set of the network entities within the IMS 1140 are a call/session control function (CSCF), a media gateway control function (MGCF) 1146, a media gateway (MGW) 1148, and a master subscriber database, called a home subscriber server (HSS) 1150. The HSS 1150 may be common to the GSM core network 1101, the GPRS network 1130 as well as the IP multimedia network 1138.

The IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

The I-CSCF 1143 forms an entrance to a home network and hides the inner topology of the home network from other networks and provides flexibility for selecting an S-CSCF. The I-CSCF 1143 may contact a subscriber location function (SLF) 1145 to determine which HSS 1150 to use for the particular subscriber, if multiple HSSs 1150 are present. The S-CSCF 1144 may perform the session control services for the MS 1102. This includes routing originating sessions to external networks and routing terminating sessions to visited networks. The S-CSCF 1144 may also decide whether an application server (AS) 1152 is required to receive information on an incoming SIP session request to ensure appropriate service handling. This decision is based on information received from the HSS 1150 (or other sources, such as an application server 1152). The AS 1152 may also communicate to a location server 1156 (e.g., a Gateway Mobile Location Center (GMLC)) that provides a position (e.g., latitude/longitude coordinates) of the MS 1102.

The HSS 1150 may contain a subscriber profile, including call replay preferences, and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

The MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) The MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

While example embodiments of call replay systems and methods such as those described herein have been described in connection with various communications devices and computing devices/processors, the underlying concepts can be applied to any communications or computing device, processor, or system capable of implementing the call replay systems and methods described. The various techniques described herein can be implemented in connection with hardware or software or, where appropriate, with a combination of both. Thus, the methods and apparatuses for call replay systems and methods, or certain aspects or portions thereof, can take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for a call replay system. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and systems for call replay as described herein can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for a call replay system. When implemented on a general-purpose processor, the program code combines with the processor to provide a unique apparatus that operates to invoke the functionality of a call replay system. Additionally, any storage techniques used in connection with a call replay system can invariably be a combination of hardware and software.

While the call replay systems and methods have been described in connection with the various embodiments of the various figures, it is to be understood that other similar embodiments can be used or modifications and additions can be made to the described embodiments for performing the same functions of a call replay system without deviating from the described systems and methods. For example, one skilled in the art will recognize that a call replay system as described in the present application may apply to any environment, whether wired or wireless, and may be applied to any number of such devices connected via a communications network and interacting across the network. Therefore, call replay systems such as those described herein should not be limited to any single embodiment, but rather should be construed in breadth and scope in accordance with the appended claims.

What is claimed is:

1. A method comprising:
   recording, on a network device, a live telephone communication to generate a recorded telephone communication;
   detecting, on a network device in the live telephone communication, a spoken identifier of a user participating in the live telephone communication;
   responsive to detecting the spoken identifier of the user, transmitting, from the network device to a device associated with the user, the recorded telephone communication while the live telephone communication is ongoing;
   the network device detecting, in the live telephone communication, a voice of the user; and
   responsive to detecting the voice of the user, the network device stopping transmission of the recorded telephone communication.

2. The method of claim 1, wherein the recorded telephone communication is transmitted solely to the device associated with the user.

3. The method of claim 1, wherein the recorded telephone communication is transmitted to a plurality of devices, wherein each of the plurality of devices is associated with a participant in the live telephone communication.

4. The method of claim 1, wherein the recorded telephone communication is transmitted to a subset of a plurality of devices, wherein each of the plurality of devices is associated with a participant in the live telephone communication.

5. The method of claim 1, wherein transmitting the recorded telephone communication comprises transmitting a most recently recorded portion of the recorded telephone communication.

6. The method of claim 1, wherein transmitting the recorded telephone communication comprises altering audio content of the recorded telephone communication.

7. The method of claim 1, wherein transmitting the recorded telephone communication comprises transmitting the recorded telephone communication to a second device associated with the user.

8. A system, comprising:
   a memory comprising executable instructions; and
   a processor, coupled to the memory, wherein the processor, when executing the executable instructions, effectuates operations comprising:
   recording a live telephone communication to generate a recorded telephone communication;
   detecting, in the live telephone communication, a spoken identifier of a user participating in the live telephone communication;
   responsive to detecting the spoken identifier of the user, transmitting, to a device associated with the user, the recorded telephone communication while the live telephone communication is ongoing;
   detecting, in the live telephone communication, a voice of the user; and
   responsive to detecting the voice of the user, stopping transmission of the recorded telephone communication.

9. The system of claim 8, wherein the operation of transmitting the recorded telephone communication comprises transmitting the recorded telephone communication solely to the device associated with the user.

10. The system of claim 8, wherein the operation of transmitting the recorded telephone communication comprises transmitting the recorded telephone communication to a plurality of devices, wherein each of the plurality of devices is associated with a participant in the live telephone communication.

11. The system of claim 8, wherein the operation of transmitting the recorded telephone communication comprises transmitting the recorded telephone communication a subset of a plurality of devices, wherein each of the plurality of devices is associated with a participant in the live telephone communication.

12. The system of claim 8, wherein the operation of transmitting the recorded telephone communication comprises transmitting a most recently recorded portion of the recorded telephone communication.

13. The system of claim 8, wherein the operation of transmitting the recorded telephone communication comprises altering audio content of the recorded telephone communication.

14. The system of claim 8, wherein the operation of transmitting the recorded telephone communication comprises transmitting the recorded telephone communication to a second device associated with the user.

15. A tangible computer-readable storage device comprising computer-executable instructions, which when executed by a processor, cause the processor to effectuate operations comprising:
   recording a live telephone communication to generate a recorded telephone communication;
   detecting, in the live telephone communication, a spoken identifier of a user participating in the live telephone communication;
   responsive to detecting the spoken identifier of the user, transmitting, to a device associated with the user, the recorded telephone communication while the live telephone communication is ongoing;

detecting, in the live telephone communication, a voice of the user; and responsive to detecting the voice of the user, stopping transmission of the recorded telephone communication.

16. The tangible computer-readable storage device of claim 15, wherein the operation of transmitting the recorded telephone communication comprises transmitting the recorded telephone communication solely to the device associated with the user.

17. The tangible computer-readable storage device of claim 15, wherein the operation of transmitting the recorded telephone communication comprises transmitting the recorded telephone communication to a plurality of devices, wherein each of the plurality of devices is associated with a participant in the live telephone communication.

18. The tangible computer-readable storage device of claim 15, wherein the operation of transmitting the recorded telephone communication comprises transmitting the recorded telephone communication a subset of a plurality of devices, wherein each of the plurality of devices is associated with a participant in the live telephone communication.

19. The tangible computer-readable storage device of claim 15, wherein the operation of transmitting the recorded telephone communication comprises transmitting a most recently recorded portion of the recorded telephone communication.

20. The tangible computer-readable storage device of claim 15, wherein the operation of transmitting the recorded telephone communication comprises altering audio content of the recorded telephone communication.

* * * * *